March 10, 1925.

M. O'HARROW

STEAM TRAP

Filed March 19, 1924

1,528,842

Inventor
Martin O'Harrow

Patented Mar. 10, 1925.

1,528,842

UNITED STATES PATENT OFFICE.

MARTIN O'HARROW, OF TORONTO, ONTARIO, CANADA.

STEAM TRAP.

Application filed March 19, 1924. Serial No. 700,405.

*To all whom it may concern:*

Be it known that I, MARTIN O'HARROW, a subject of the King of Great Britain, and resident of the city of Toronto, county of York, Province of Ontario, in the Dominion of Canada, have invented certain new and useful Improvements in Steam Traps, as described in the following specification and illustrated in the accompanying drawings, that form part of the same.

The principal objects of this invention are, to provide a steam trap which will be very dependable in its operation, the moving parts thereof having the element of friction reduced to the minimum.

A still further object is to dispense with the use of stuffing boxes and springs.

The principal features of the invention consist in the novel arrangement of air and steam valves coupled to operate in unison and both closing with the pressure and in the novel construction of a pivotally supported member for operating said valves operated by a float and lever mechanism.

Figure 1:
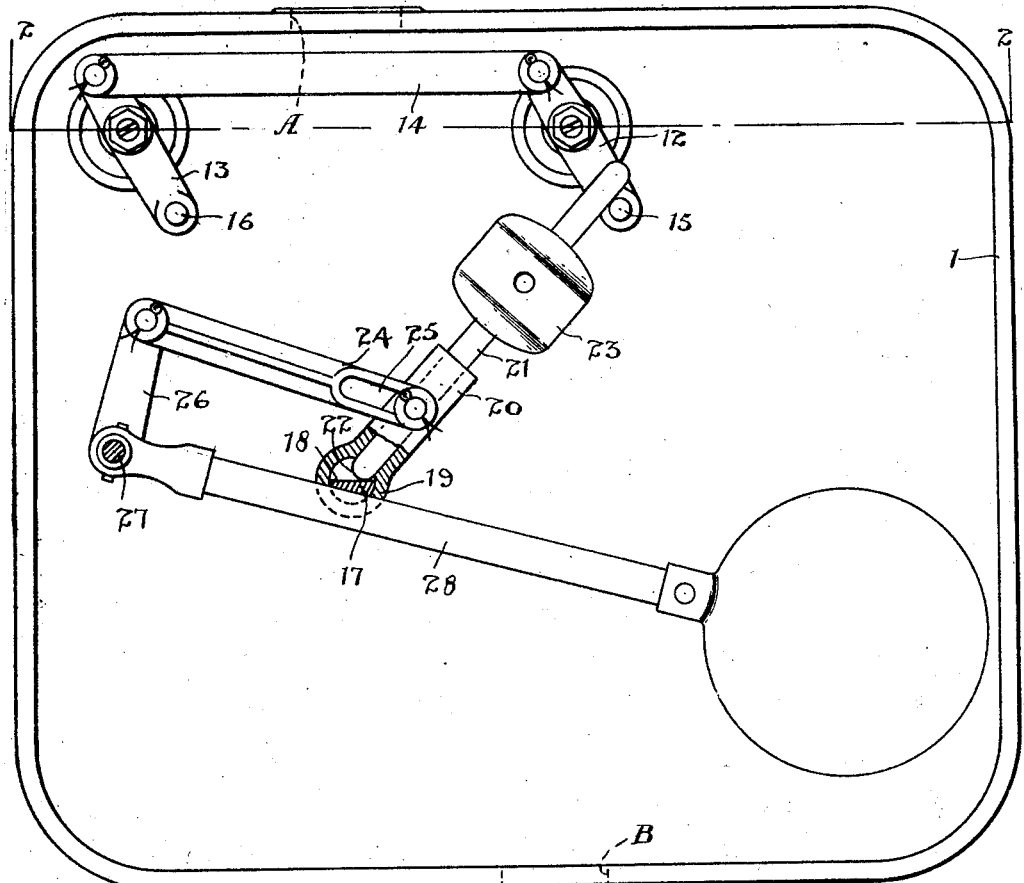

In the drawings, Figure 1 is an elevational and part sectional view of the interior of my improved stream trap.

Figure 2:
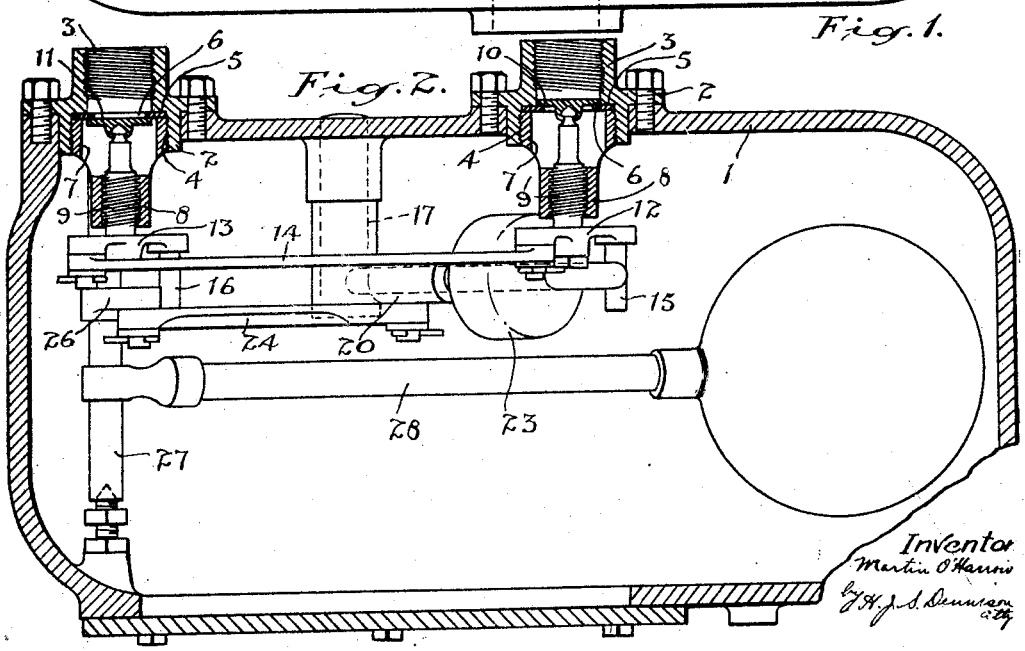

Figure 2 is a horizontal sectional view taken on the line 2—2 of Figure 1.

In the construction herein shown the casing 1 is provided with flanges or glands 2 having the threaded nipples 3 adapted to receive the pipe connections, one leading from the boiler and the other to an air vent.

The flanges 2 are each formed with threaded internal recesses 4 and abutting the shoulders 5 are arranged the ring-shaped valve seats 6. These are secured in place by the hollow threaded members 7 which are provided at their inward ends with the spirally threaded collars 8.

Valve stems 9 spirally threaded are supported in each of the collars, and valves 10 and 11 are flexibly mounted on the inner ends thereof, the valve 10 which is arranged in the steam inlet being spaced outside of the ring seat 6 and the valve 11 being placed inside the ring seat 6.

The valve stems have secured to their inner ends the operating levers 12 and 13 which are coupled together at the upper ends by the link 14.

Pins 15 and 16 project from the lower ends of the levers 12 and 13 respectively.

A pin 17 is rigidly secured in the casing below the valves 10 and 11 and midway between the same. This pin is formed at its inner end with a flattened horizontally arranged surface 18.

Upon the pin 17 is rotatably mounted a sleeve member 19 having a tubular extension 20 arranged adjacent to the outer end and at right angles thereto.

The sleeve 19 is loosely mounted on the pin so that it will rotate quite freely.

A rod 21 preferably formed of hard non-corrosive metal is slidably arranged in the tubular extension 20 of the sleeve 19 and is provided with a rounded inner end 22 which rests upon the flat horizontal surface 18 of the pin 17.

The rod extends upwardly from the pin 17 and engages either one of the pins 15 or 16 carried by the valve operating levers.

Upon the rod 21 is adjustably secured a weight 23. This weight is adjustable upon the rod the desired distance to give the necessary impact to the rod in coming in contact with either of the pins 15 or 16 to positively rotate the valve spindles and lift the valves from their seats.

The sleeve 19 is operated by a link 24 having a slot engaging a pin 25 extending laterally from the tubular extension 20. The opposite end of the link is pivotally connected to the crank arm 26 which is secured to or forms part with a pivot rod 27 supported in suitable bearings in the casing.

A float arm 28 is rigidly secured to the pivot rod 27.

In the operation of this steam trap, water flows in through the inlet A arranged on the top or side walls of the casing adjacent to the top thereof and as the level of water rises within the casing, the float swings the pivot rod and crank arm and through the link 24 it swings the sleeve 19 on its pivot.

The sleeve 19 turns very freely as it carries only its own weight, the valve operating weight 23 being supported by the rounded end of the rod 21 resting upon the flat horizontal surface 18 of the pin 17. The minimum of friction is thus achieved and as the sleeve is rotated the rod 21 slips freely in the tubular extension 20 thereof.

When the float has raised to a level sufficiently high to move the sleeve 19 so that the tubular extension crosses over the vertical centre line of the pin 17, the weight then swings the sleeve and the rod 21 is brought into sharp engaging contact with either of the projecting pins 15 or 16 of the valve operating arms whichever way the weight is operating. The valves, being coupled by the link 14, operate in unison so that the air valve is closed instantly with the opening of the steam valve and vice versa, when the steam valve is closed the air valve is opened.

Upon the closing of the air valve and the opening of the steam valve steam from the boiler enters the casing 1 and the water flows out through the outlet B in the bottom of the casing to the boiler. As the water runs out of the casing 1 the float drops and the link 24 swings the sleeve 19 on its pivot support raising it until it passes the vertical dead centre when the weight rod pulls in the other direction and closes the steam valve concurrently opening the air valve and allowing the air to escape upon the inflow of the return or condensate water from the steam system.

A structure such as described is extremely simple. All springs are dispensed with and by reason of the free pivotal support of the weight carrying rod the weight operates with dependable accuracy at all times, as it swings upon a perfectly free pivot which cannot bind.

In addition to the accuracy of the operation of this trap the parts being of an extremely simple nature may be manufactured at very low cost, thus a very desirable trap is produced.

What I claim as my invention is:—

1. In a steam trap, a casing having a steam inlet and an air outlet, valves controlling said steam inlet and air outlet, a rigid member having a fixed bearing surface arranged midway between and below said valves, a weighted member having a point support resting upon said fixed bearing surface and adapted to swing either side of a vertical centre to operate said valves, a float, and means operatively connected with said float and movable in relation to said bearing surface adapted to swing said weighted rod on its point support.

2. In a steam trap, a casing having a steam inlet and an air outlet, valves controlling said steam inlet and air outlet, a pin extending inwardly from the side wall of the casing below said valves and midway therebetween, said pin having a flattened horizontal surface, a sleeve rotatably mounted on said pin and having a tubular right angular extension, a weighted rod slidably arranged in said tubular extension and having a point contact with the flat surface of said pin, said rod being adapted to operate said valves, a float lever pivotally mounted in the casing, and a slotted link connected with said float lever and operatively connected with said sleeve to swing it on its axis.

3. In a steam trap, a casing having a pair of openings arranged in one side adjacent to the top, valve seats arranged in said openings, a steam valve closing against one of said seats from the outside, an air valve closing against the other of said seats from the inside, threaded spindles supporting said valves, operating levers secured to said spindles and each having a projecting pin, a link connecting said valve levers, a weighted rod supported on a point pivot midway between said valves, means for holding said weighted rod in its position on its pivot, and float controlled means for operating said holding means.

4. In a steam trap, a closed tank having a steam inlet and an air outlet arranged adjacent to the top, a rigid plane surface arranged intermediately between said inlet and outlet, a member oscillating about said plane surface and having a sleeve extension, a weighted rod slidable in said sleeve and resting on said plane surface, valves arranged in said steam inlet and air outlet openings, valve levers secured to said valves and having pin extensions adapted to be engaged by said weighted rod, means connecting said valves to operate in unison, a horizontal rod supported in pivots in the casing, a float arm secured to said rod, a lever secured to said rod, and a link pivotally connected to said lever and having a slotted end engaging the sleeve supporting said weighted rod.

MARTIN O'HARROW.